United States Patent
Teng et al.

(10) Patent No.: US 8,182,129 B2
(45) Date of Patent: May 22, 2012

(54) LIGHT GUIDE UNIT AND BACKLIGHT MODULE

(75) Inventors: Tun-Chien Teng, Hsin-Chu (TW); Jyh-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 393 days.

(21) Appl. No.: 12/479,871

(22) Filed: Jun. 8, 2009

(65) Prior Publication Data

US 2010/0053997 A1 Mar. 4, 2010

(30) Foreign Application Priority Data

Sep. 1, 2008 (TW) ................................ 97133449 A

(51) Int. Cl.
*F21V 5/02* (2006.01)
(52) U.S. Cl. ....... 362/617; 362/615; 362/97.1; 362/97.2
(58) Field of Classification Search .................. 362/97.1, 362/97.2, 617, 615, 600
See application file for complete search history.

(56) References Cited

U.S. PATENT DOCUMENTS

| | | | | |
|---|---|---|---|---|
| 5,400,224 | A * | 3/1995 | DuNah et al. .................. | 362/616 |
| 6,425,675 | B2 * | 7/2002 | Onishi et al. .................. | 362/607 |
| 7,503,684 | B2 * | 3/2009 | Ueno et al. .................... | 362/620 |
| 7,543,973 | B2 * | 6/2009 | Shimura ........................ | 362/619 |
| 7,663,713 | B2 * | 2/2010 | Saito et al. ...................... | 349/65 |
| 7,682,062 | B2 * | 3/2010 | Stadtwald-Klenke ........ | 362/612 |
| 7,758,199 | B2 * | 7/2010 | Chang .......................... | 362/97.3 |
| 2001/0053074 | A1 * | 12/2001 | Onishi et al. ................... | 362/31 |
| 2006/0133113 | A1 | 6/2006 | Koike et al. | |

FOREIGN PATENT DOCUMENTS

| | | |
|---|---|---|
| CN | 101140335 A | 3/2008 |
| CN | 201107519 Y | 8/2008 |
| JP | 05-060908 | 3/1993 |
| JP | 09-015426 | 1/1997 |
| JP | 09-101521 | 4/1997 |
| JP | 2007-305544 | 11/2007 |
| TW | M288385 | 3/2006 |
| TW | 200813547 | 3/2008 |
| TW | 200815790 | 4/2008 |

OTHER PUBLICATIONS

"First Office Action of China Counterpart Application", issued on Sep. 16, 2011, with English translation thereof, p. 1-p. 10, in which the listed references were cited.
"Office Action of Japan Counterpart Application", issued on Dec. 13, 2011, p. 1-p. 2, in which the listed references were cited.

* cited by examiner

*Primary Examiner* — Anabel Ton
(74) *Attorney, Agent, or Firm* — Jianq Chyun IP Office

(57) ABSTRACT

A light guide unit including a light guide plate and a plurality of rod lenses is provided. The light guide plate has a first surface, a second surface opposite to the first surface, and a light incident surface connecting the first surface and the second surface. The light guide plate further has a plurality of diffusion net points located at the second surface. The rod lenses are disposed on the first surface. Each of the rod lenses extends along a first direction and has a curved surface curving in a second direction. The rod lenses are arranged along the second direction. Pitches of the adjacent diffusion net points in the first direction are smaller than pitches of the adjacent diffusion net points in the second direction. A backlight module using the light guide unit is also provided.

17 Claims, 10 Drawing Sheets

LIGHT GUIDE UNIT AND BACKLIGHT MODULE

CROSS-REFERENCE TO RELATED APPLICATION

This application claims the priority benefit of Taiwan application serial no. 97133449, filed on Sep. 1, 2008. The entirety of the above-mentioned patent application is hereby incorporated by reference herein and made a part of this specification.

BACKGROUND OF THE INVENTION

1. Field of the Invention

The present invention generally relates to a light source module and an optical element thereof and, in particular, to a backlight module and a light guide unit thereof.

2. Description of Related Art

FIG. 1 is a schematic cross-sectional view of a conventional backlight module. Referring to FIG. 1, a conventional backlight module 100 includes a light guide plate 110, a cold cathode fluorescent lamp (CCFL) 120, a reflecting plate 130, and a diffusion plate 140. The light guide plate 110 has a first surface 112, a second surface 114 opposite to the first surface 112, and a light incident surface 116 connecting the first surface 112 and the second surface 114. The CCFL 120 is disposed beside the light incident surface 116 and is adapted to emit a light beam 122 towards the light incident surface 116. A portion of the light beam 122a enters the light guide plate 110 through the light incident surface 116 and is transmitted to the reflecting plate 130 through a light diffusion effect of titanium dioxide ($TiO_2$) net points 114a on the second surface 114. The reflecting plate 130 reflects a portion of the light beam 122a and enables the portion of the light beam 122a to pass through the second surface 114, the first surface 112, and the diffusion plate 140 in sequence. On the other hand, after entering the light guide plate 110, a portion of light beam 122b is transmitted to the first surface 112 through the light diffusion effect of the $TiO_2$ net points 114a. Next, the portion of the light beam 122b passes through the first surface 112 and the diffusion plate 140 in sequence. After passing through the diffusion plate 140, the light beam 112 (including the portion of the light beam 112a and the portion of the light beam 112b) forms a surface light source.

When the $TiO_2$ net points 114a are formed on the second surface 114 in a screen printing manner, sizes and pitches of the $TiO_2$ net points 114a may not be quite small. Therefore, when no diffusion plate 140 is disposed above the light guide plate 110, discontinuous bright spots formed by the $TiO_2$ net points 114a may be recognized by naked eyes, such that the backlight module 100 may not form a uniform surface light source.

In order to improve the problem that the discontinuous bright spots are recognized by the naked eyes, in the prior art, the discontinuous bright spots are made to be fuzzy by the diffusion plate 140 for achieving a shielding effect. However, the additionally used diffusion plate 140 causes an increased cost and an optical loss.

SUMMARY OF THE INVENTION

Accordingly, the present invention is directed to a light guide unit, capable of reducing a cost, and uniformly guiding a light.

The present invention is further directed to a backlight module, capable of reducing a cost, and forming a uniform surface light source.

An embodiment of the present invention provides a light guide unit, including a light guide plate and a plurality of rod lenses. The light guide unit has a first surface, a second surface opposite to the first surface, and a light incident surface connecting the first surface and the second surface. The light guide plate further has a plurality of diffusion net points located at the second surface. The rod lenses are disposed on the first surface. Each of the rod lenses extends along a first direction and has a curved surface curving in a second direction. The rod lenses are arranged along the second direction. Pitches of the adjacent diffusion net points in the first direction are smaller than pitches of the adjacent diffusion net points in the second direction.

In an embodiment of the present invention, the first direction is substantially perpendicular to the second direction. The light guide plate and the rod lenses are integrally formed, and the first direction is substantially perpendicular to the light incident surface. In an embodiment of the present invention, the rod lenses form a rod lens plate, and the rod lens plate and the light guide plate are separately formed. The widths of the diffusion net points in the second direction increase progressively along a direction away from the light incident surface.

In an embodiment of the present invention, the number densities of the diffusion net points increase progressively along a direction away from the light incident surface. The diffusion net points may form a plurality of strip patterns. Each of the strip patterns extends away from the light incident surface, and the strip patterns are arranged along a direction parallel with the light incident surface. A width of each of the strip patterns increases progressively along a direction away from the light incident surface. The curved surfaces of the rod lenses all are convex surfaces for example. In an embodiment of the present invention, portions of the curved surfaces of the rod lenses are convex surfaces, other portions of the rod lenses are concave surfaces, and the convex surfaces and the concave surfaces are alternately arranged in the second direction.

Another embodiment of the present invention provides a backlight module, including the above mentioned light guide unit and a light emitting element. The light emitting element is disposed beside the light incident surface. The light emitting element is adapted to emit a light beam, and the light beam enters the light guide plate through the light incident surface and is transmitted to the rod lenses through the first surface.

In an embodiment of the present invention, the back light module further includes a reflecting unit disposed on one side of the second surface for reflecting the light beam to the first surface.

In the light guide unit according to the embodiment of the present invention, pitches of the diffusion net points in the first direction are smaller than pitches of the diffusion net points in the second direction, and the light guide unit has the rod lenses extending along the first direction, so the rod lenses may reduce the widths and the pitches of the diffusion net points in the second direction, such that the diffusion net points may not be recognized by naked eyes because of the effect of the rod lenses. In this manner, the backlight module according to the embodiment of the present invention may form the uniform surface light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
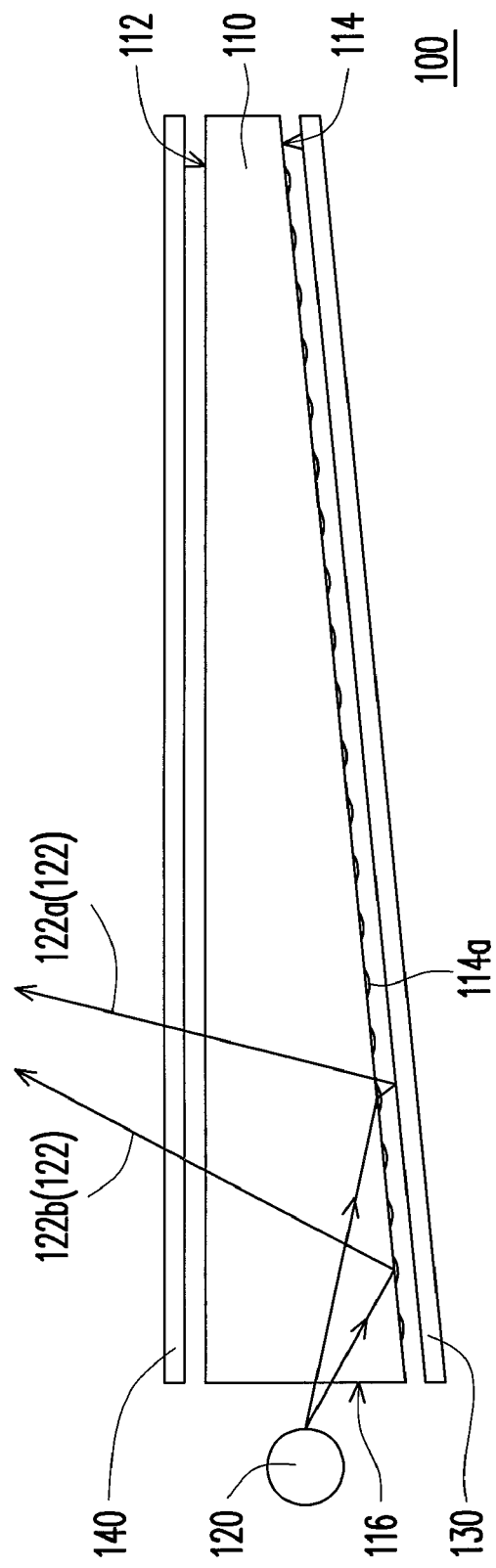
FIG. 1 is a schematic cross-sectional view of a conventional backlight module.
Figure 2A:
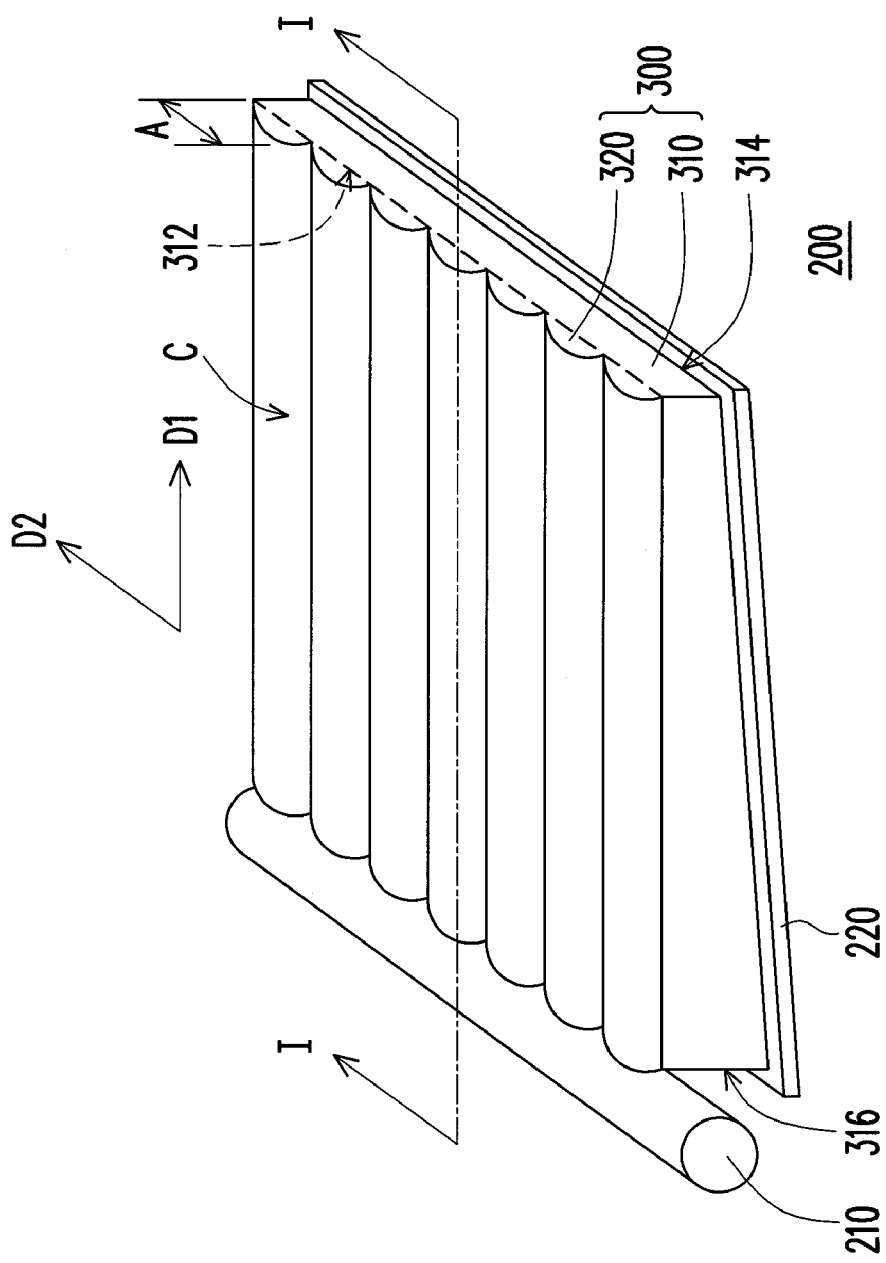
FIG. 2A is a schematic three-dimensional view of a backlight module according to a first embodiment of the present invention.
Figure 2B:
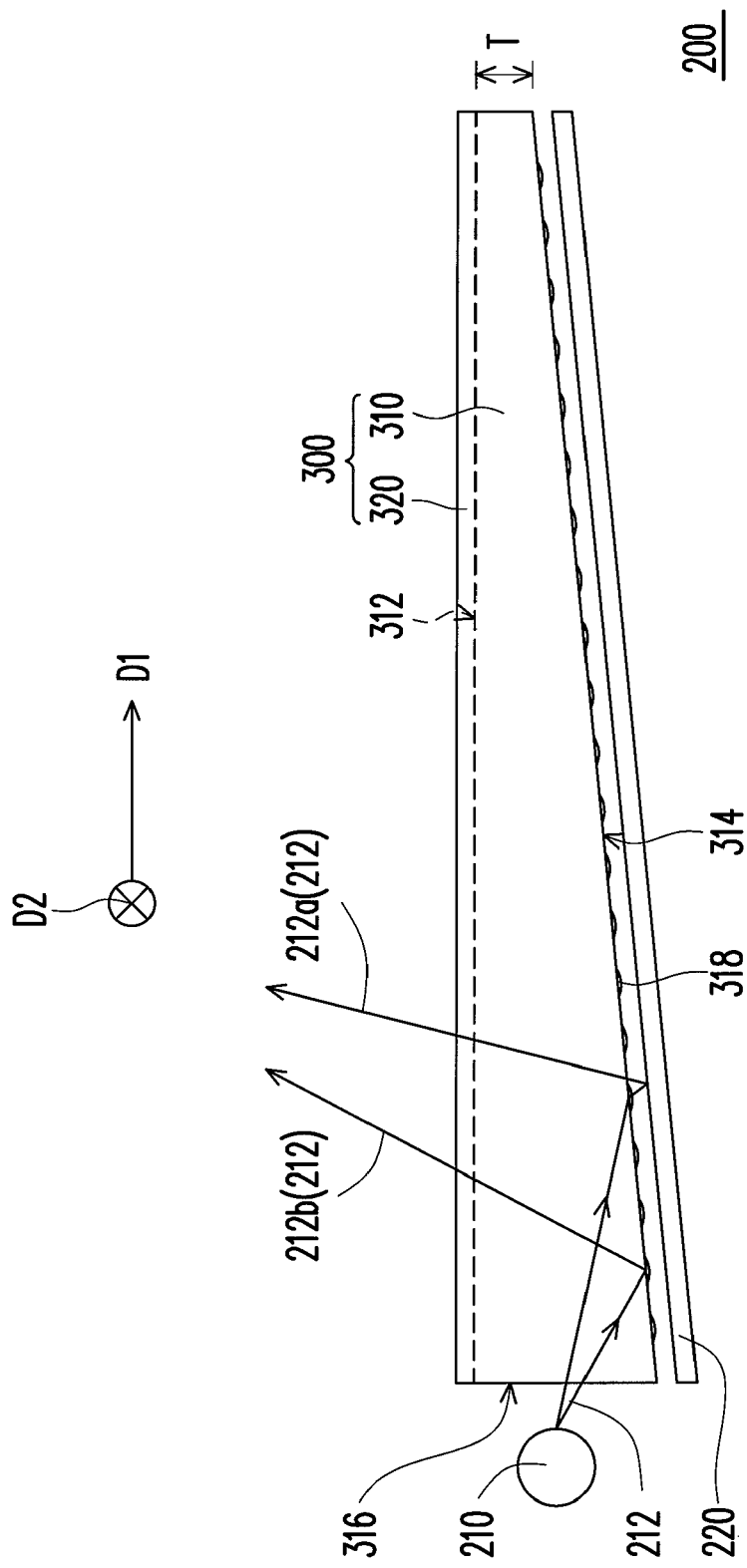
FIG. 2B is a schematic cross-sectional view of the backlight module of FIG. 2A taken along a line I-I.
Figure 2C:
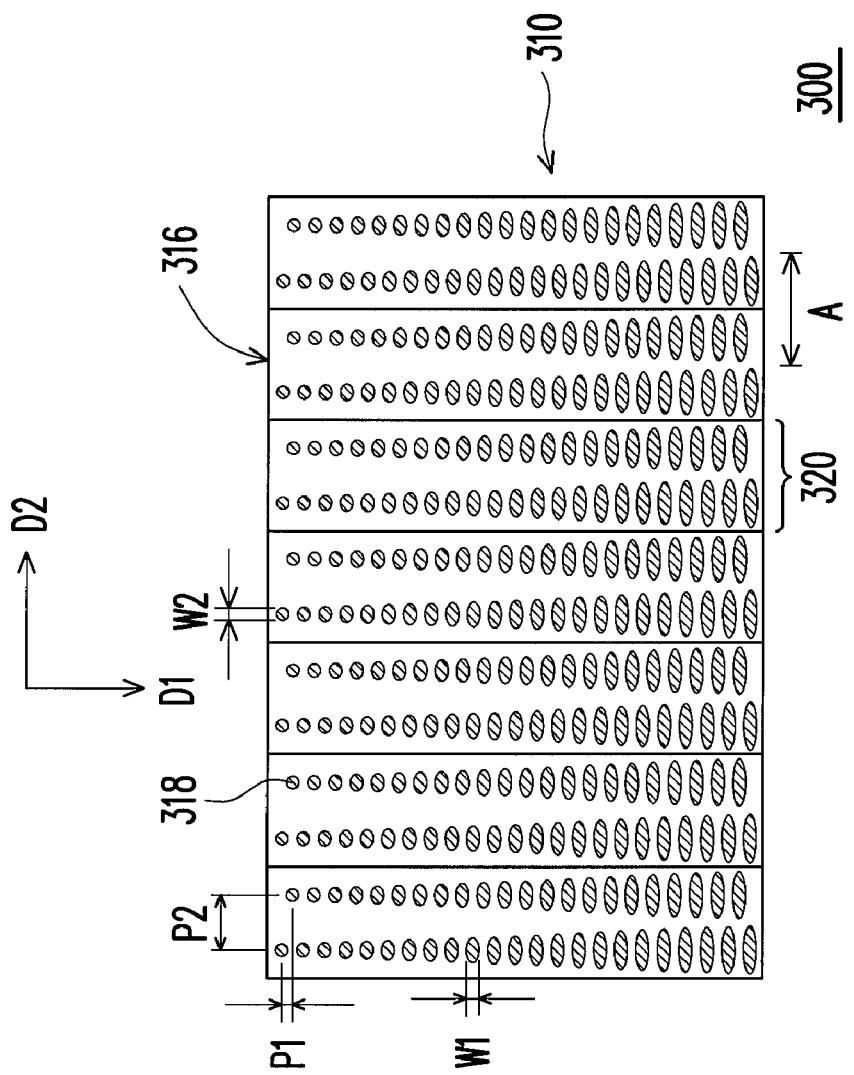
FIG. 2C is a perspective view of a light guide unit of FIG. 2A with a first surface facing forwards.

FIG. 2A is a schematic three-dimensional view of a backlight module according to a first embodiment of the present invention, FIG. 2B is a schematic cross-sectional view of the backlight module of FIG. 2A taken along a line I-I, and FIG. 2C is a perspective view of a light guide unit of FIG. 2A with the first surface facing forwards. Referring to FIGS. 2A to 2C, a backlight module 200 of this embodiment includes a light guide unit 300 and a light emitting element 210. The light guide unit 300 includes a light guide plate 310 and a plurality of rod lenses 320. The light guide plate 310 has a first surface 312, a second surface 314, and a light incident surface 316. The first surface 312 is opposite to the second surface 314, and the light incident surface 316 connects the first surface 312 and the second surface 314. The rod lenses 320 are disposed on the first surface 312. Each of the rod lenses 320 extends along a first direction D1 and has a curved surface C curving in a second direction D2. In this embodiment, the curved surfaces C of the rod lenses 320 are convex surfaces, for example, cylindrical surfaces, elliptic cylindrical surfaces, or other shapes of convex surfaces. In addition, in this embodiment, the first direction D1 is substantially perpendicular to the second direction D2. Further, in this embodiment, the light guide plate 310 and the rod lenses 320 are integrally formed, and the first direction D1 is substantially perpendicular to the light incident surface 316.

In addition, the light guide plate 310 further has a plurality of diffusion net points 318 located at the second surface 314. Pitches P1 of the adjacent diffusion net points 318 in the first direction D1 are smaller than pitches P2 in the second direction D2. In this embodiment, the diffusion net points 318 are, for example, $TiO_2$ net points or net points made of other materials suitable for diffusing the light. However, in other embodiments, the diffusion net points may also be concave points or convex points on the second surface 314. The light emitting element 210 is disposed beside the light incident surface 316. In this embodiment, the light emitting element 210 is, for example, a cold cathode fluorescent lamp (CCFL). However, in other embodiments, the light emitting element 210 may also be a light bar composed of a plurality of light emitting diodes (LEDs) or other appropriate light emitting elements. The light emitting element 210 is adapted to emit a light beam 212, and the light beam 212 enters the light guide plate 310 through the light incident surface 316 and is transmitted to the rod lenses 320 through the first surface 312. Particularly, after being transmitted to the diffusion net points 318, a partial light beam 212a of the light beam 212 entering the light guide plate 310 may generate light scattering because of the diffusion effect of the diffusion net points 318. In this embodiment, a reflecting unit 220 may be disposed on one side of the second surface 314 for reflecting the light beam 212 to the first surface 312, for example, for reflecting the partial light beam 212a generating the light scattering to the first surface 312, and the reflecting unit 220 is, for example, a reflecting plate. On the other hand, after being transmitted to the diffusion net points 318, another partial light beam 212b of the light beam 212 may be scattered to the first surface 312 by the diffusion net points 318.

In the light guide unit 300 of this embodiment, the rod lenses 320 have the curved surfaces C curving in the second direction D2, and the pitches P2 of the diffusion net points 318 in the second direction D2 are larger than the pitches P1 in the first direction D1, so the rod lenses 320 may reduce the pitches of the bright spots of the diffusion net points 318 resulting from the scattered light beam 212 in the second direction D2 to a degree that may not be recognized by naked eyes. In addition, the pitch P1 is smaller than the pitch P2, such that the pitches of the bright spots of the diffusion net points 318 resulting from the scattered light beam 212 in the first direction D1 may not be recognized by the naked eyes. For example, a thickness T of the light guide plate 310 approximately falls within a range from 0.5 mm to 5 mm, and a pitch A of the rod lenses 320 approximately falls within a range from 24 µm to 50 µm; that is, a radius of curvature of the curved surface C approximately falls within a range from 12 µm to 25 µm. According to a simple lens imaging formula, it is estimated that an imaging magnification of the rod lenses 320 approximately falls within a range from 0.0016 to 0.032. In other words, after being imaged by the rod lenses 320 above the light guide plate 310, the pitches of the bright spots generated by the diffusion net points 318 in the second direction D2 are approximately one thirtieth to one six hundredth of the former ones.

In this manner, when the diffusion net points 318 are formed on the light guide plate 310, it is possible to use a screen printing method, the screen printing method has a low cost and is adapted to form diffusion net points with larger pitches, and as for the surface light source generated by the backlight module 200, the problem that the discrete bright spots are viewed by the naked eyes of the user is also avoided. In other words, the light guide unit 300 of this embodiment may uniformly guide the light beam 212 and has a lower cost. Therefore, the backlight module 200 of this embodiment may form the uniform surface light source and has a lower cost. In addition, when it intends to dispose a prism lens (not shown) above the light guide plate 310 to make the surface light source more converged, the diffusion plate between the rod lenses 320 and the prism lens may be omitted since the diffusion net points 318 may not be recognized by the naked eyes because of the effect of the rod lenses 320, thus further reducing the cost of the backlight module 200 and reducing the optical loss.

It should be noted that in the present invention, the diffusion net points 318 are not limited to be formed by using the screen printing method. In other embodiments, the diffusion net points 318 may also be formed by using a lithography-etching process or other etching manners.

In this embodiment, widths W2 of the diffusion net points 318 in the second direction D2 increase progressively along a direction away from the light incident surface 316. On the other hand, in this embodiment, widths W1 of the diffusion net points 318 in the first direction D1 may be maintained the same. In this manner, it is helpful for the light guide plate 310 to transmit the light beam 212 to the position far away from the light incident surface 316, such that the backlight module 200 may provide a relatively uniform surface light source.

Second Embodiment

Figure 3:
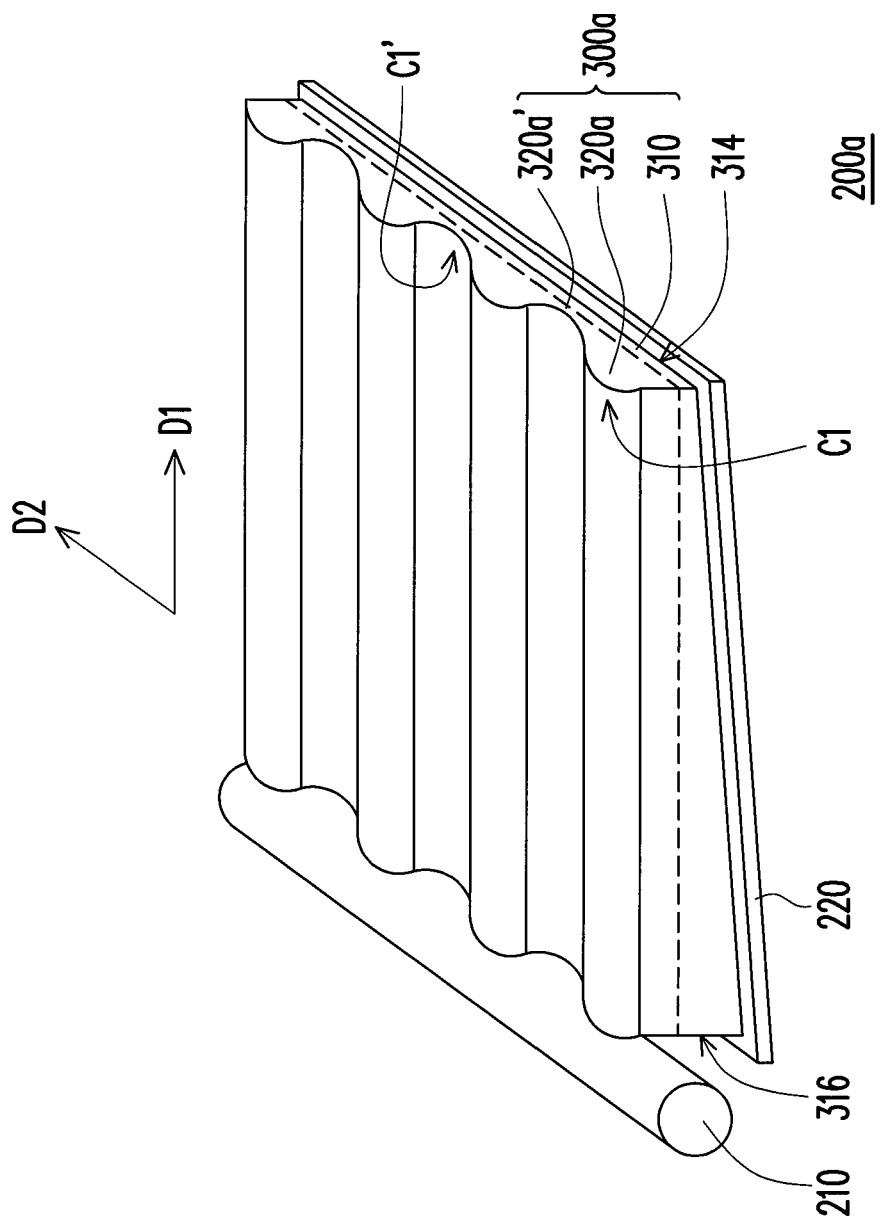
FIG. 3 is a schematic three-dimensional view of the backlight module according to a second embodiment of the present invention.

FIG. 3 is a schematic three-dimensional view of the backlight module according to a second embodiment of the present invention. Referring to FIG. 3, a backlight module 200a of this embodiment is similar to the backlight module 200 (as shown in FIG. 2A), and the difference between the backlight module 200a and the backlight module 200 is described as follows. In a light guide unit 300a of the backlight module 200a of this embodiment, curved surfaces C1 of portions of rod lenses 320a are convex surfaces, curved surfaces C1' of other portions of rod lenses 320a' are concave surfaces, and the curved surfaces C1 and the curved surface C1' are alternately arranged in the second direction D2. In this embodiment, the curved surfaces C1 and the curved surfaces C1' form a one-dimensional sinusoidal curved surface. However, in other embodiments, the curved surfaces C1 may be cylindrical surfaces, elliptic cylindrical surfaces, or other shapes of convex surface, and the curved surface C1' may be cylindrical concave surfaces, elliptic cylindrical concave surface, or other shapes of concave surfaces. The light guide unit 300a have the advantages and functions similar to the advantages and functions of the light guide unit 300 (as shown in FIG. 2A), so the advantages and functions of the light guide unit 300 are not repeated herein.

Third Embodiment

Figure 4:
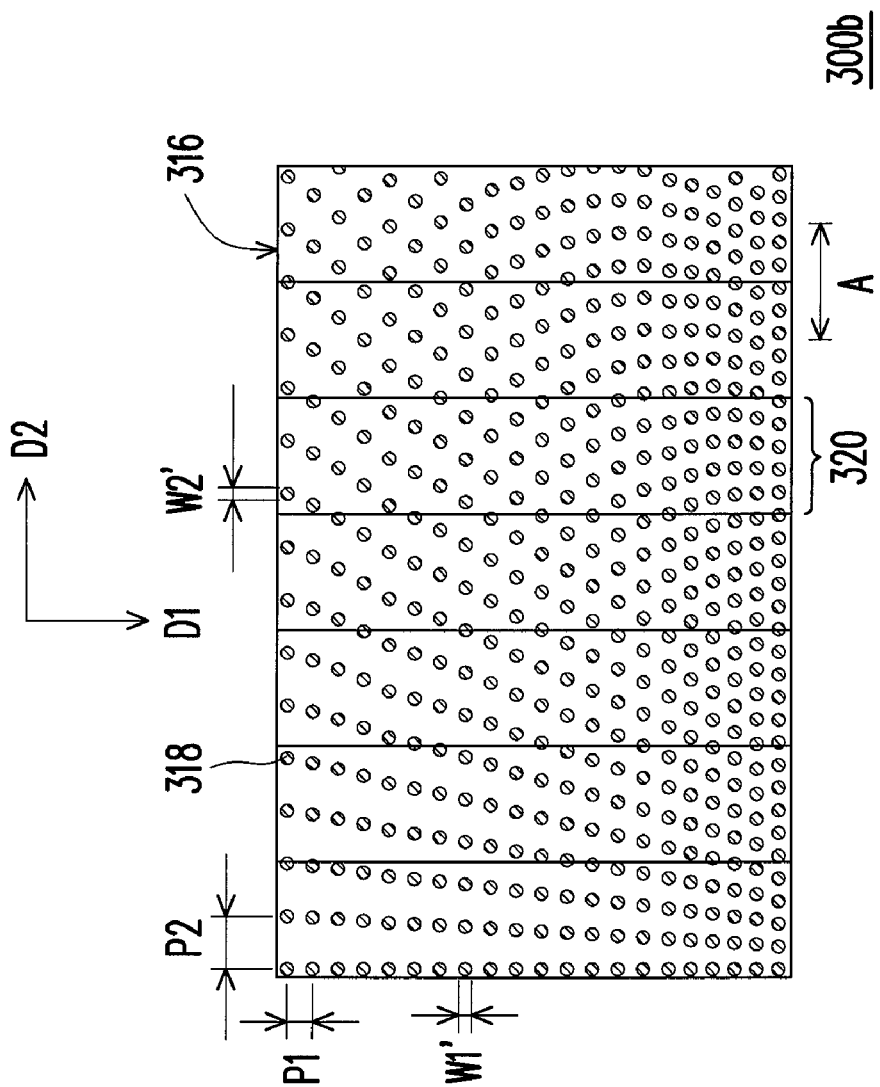
FIG. 4 is a perspective view of the light guide unit of the backlight module according to a third embodiment of the present invention with the first surface facing forwards.

FIG. 4 is a perspective view of the light guide unit of the backlight module according to a third embodiment of the present invention with the first surface facing forwards. Referring to FIG. 4, a light guide unit 300b of the backlight module of this embodiment is similar to the light guide unit 300 (Referring to FIG. 2C), and the difference between the light guide unit 300b and the light guide unit 300 is described as follows. In the light guide unit 300b of this embodiment, number densities of the diffusion net points 318 increase progressively along the direction away from the light incident surface 316. In this manner, the light guide unit 300b may guide the light outward from the position far away from the light incident surface 316, such that the backlight module may provide the uniform surface light source. In addition, in this embodiment, widths W1' of the diffusion net points 318 in the first direction D1 may be substantially the same, and widths W2' of the diffusion net points 318 in the second direction D2 may be substantially the same.

Fourth Embodiment

Figure 5:
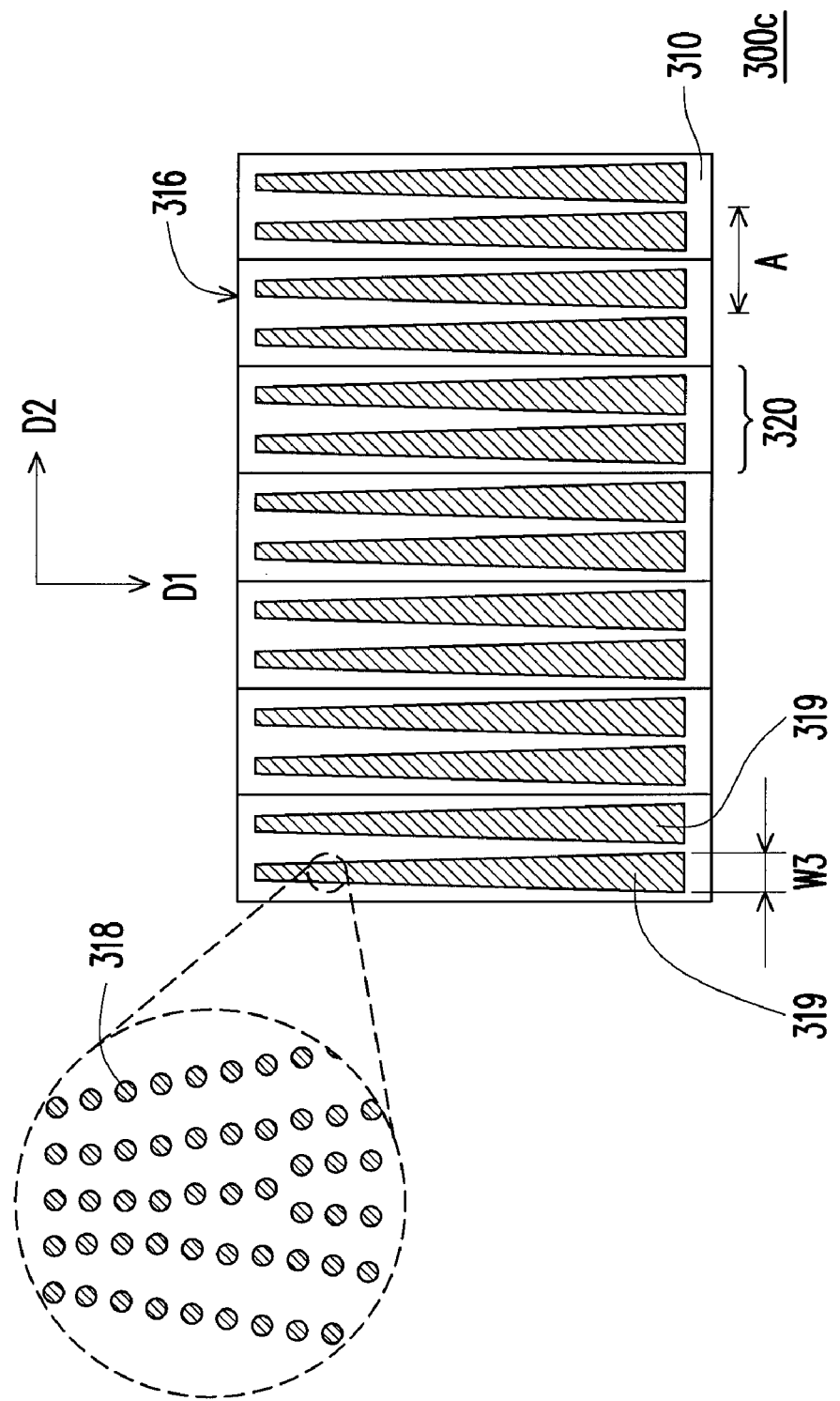
FIG. 5 is a perspective view of the light guide unit of the backlight module according to a fourth embodiment of the present invention with the first surface facing forwards.

FIG. 5 is a perspective view of the light guide unit of the backlight module according to a fourth embodiment of the present invention with the first surface facing forwards. Referring to FIG. 5, a light guide unit 300c of the backlight module of this embodiment is similar to the light guide unit 300 (Referring to FIG. 2C), and the difference between the light guide unit 300c and the light guide unit 300 is described as follows. In the light guide unit 300c of this embodiment, the plurality of diffusion net points 318 forms a plurality of strip patterns 319. Each of the strip patterns 319 extends away from the light incident surface 316, and the strip patterns 319 are arranged along a direction parallel with the light incident surface 316. In addition, a width W3 of each of the strip patterns 319 increases progressively along the direction away from the light incident surface 316, which is helpful for the light guide plate 310 to transmit the light to the position far away from the light incident surface 316, and thus the backlight module may provide the uniform surface light source.

Fifth Embodiment

Figure 6:
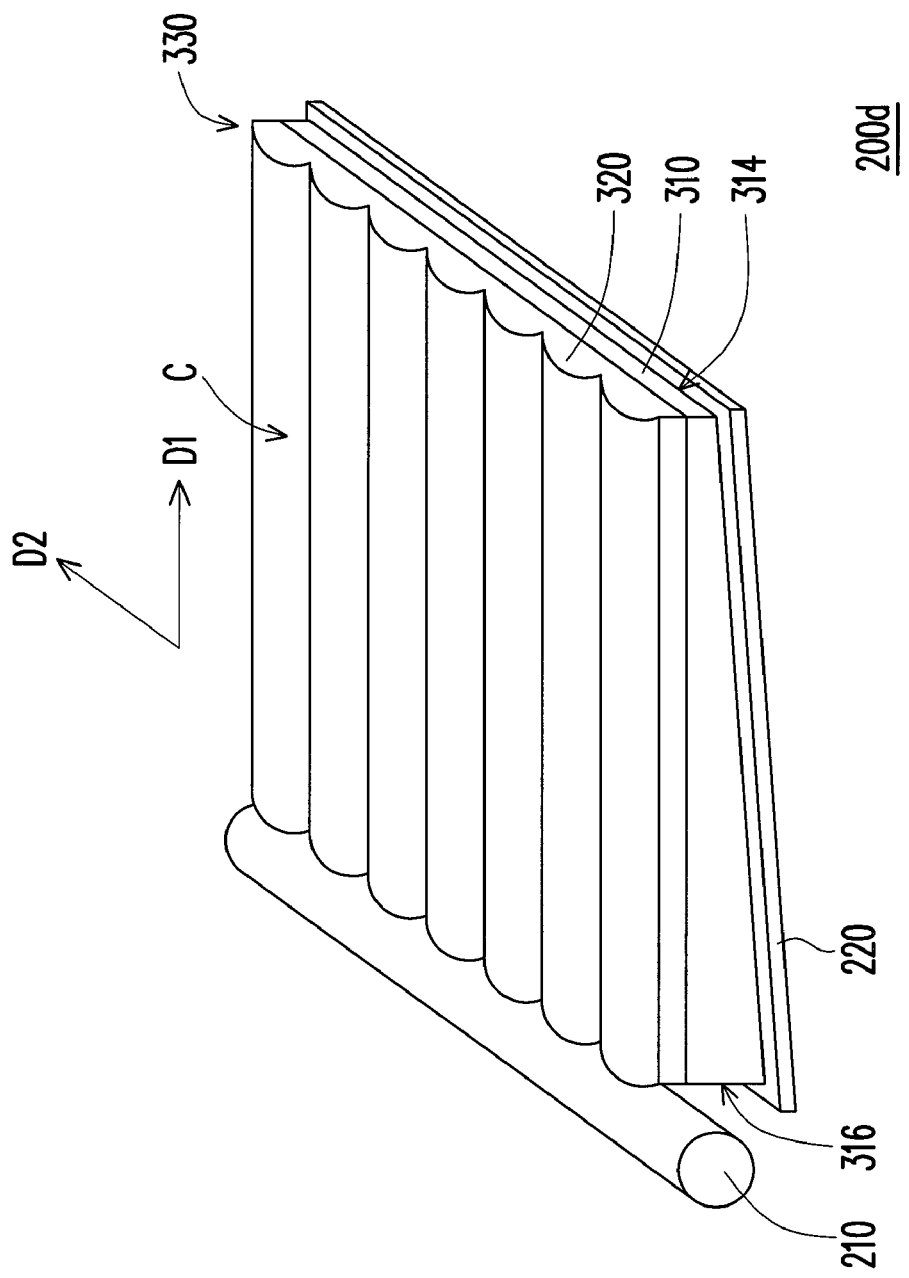
FIG. 6 is a schematic three-dimensional view of the backlight module according to a fifth embodiment of the present invention.

FIG. 6 is a schematic three-dimensional view of the backlight module according to a fifth embodiment of the present invention. Referring to FIG. 6, a backlight module 200d of this embodiment is similar to the backlight module 200 (as shown in FIG. 2A), and the difference between the backlight module 200d and the backlight module 200 is described as follows. In the backlight module 200d of this embodiment, the rod lenses 320 form a rod lens plate 330, and the rod lens plate 330 and the light guide plate 310 are separately formed.

Sixth Embodiment

Figure 7A:
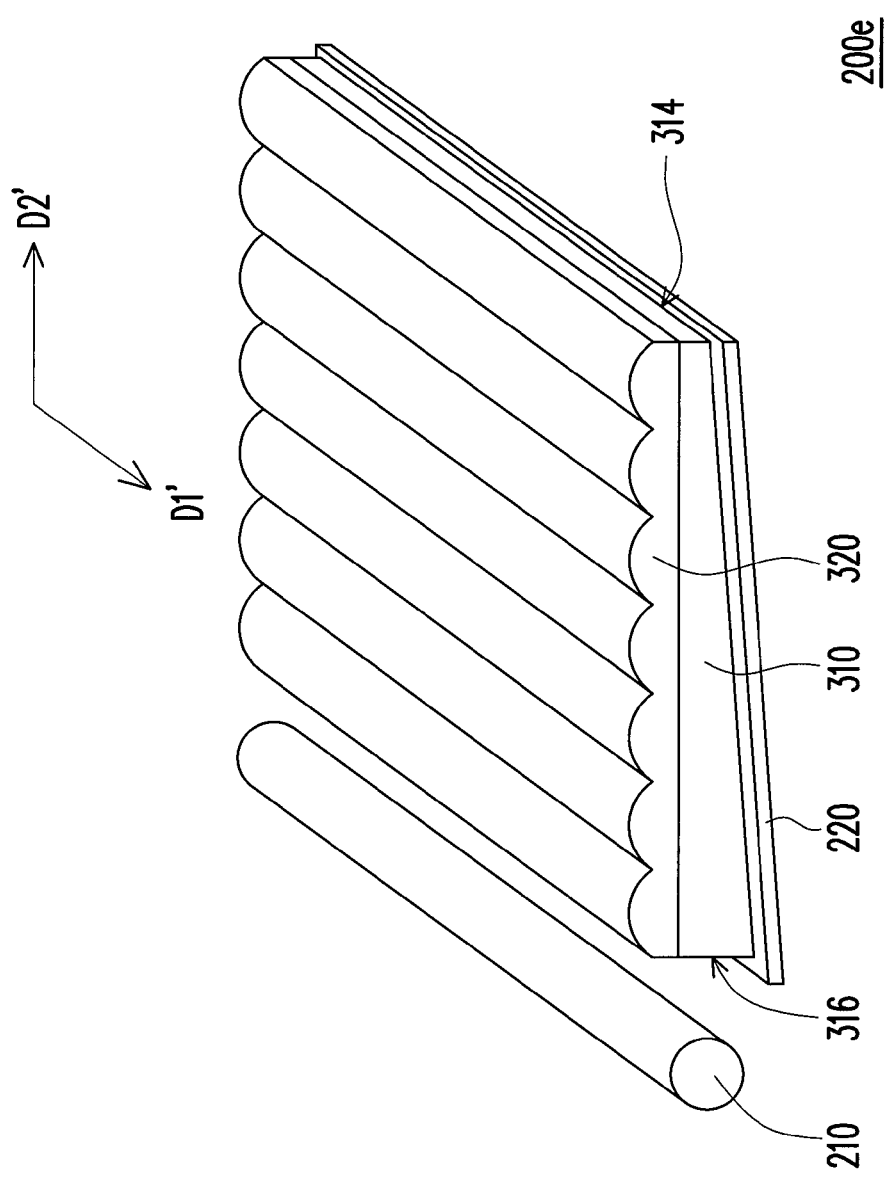
FIG. 7A is a schematic three-dimensional view of the backlight module according to a sixth embodiment of the present invention.
Figure 7B:
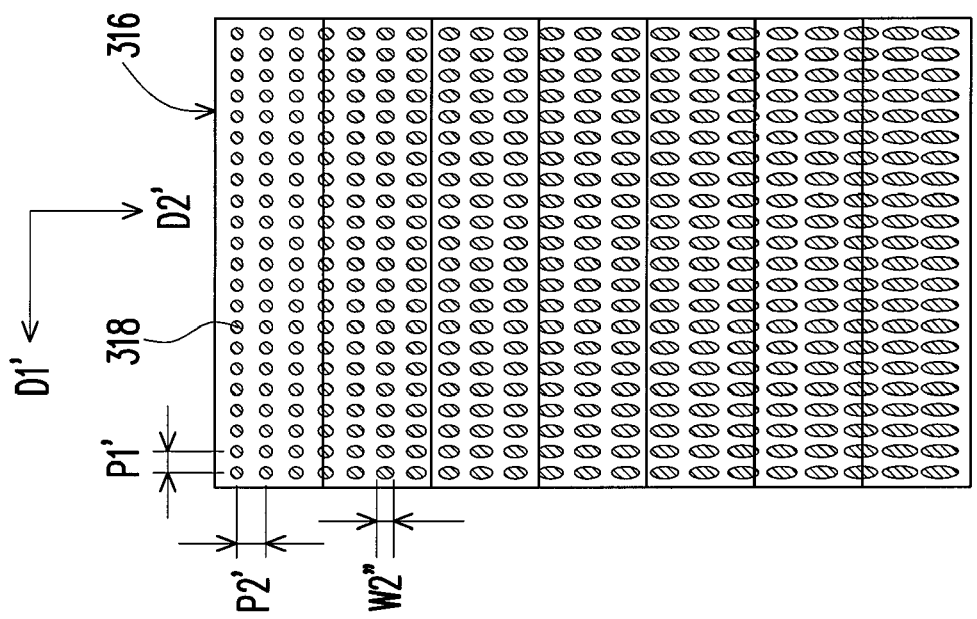
FIG. 7B is a perspective view of the light guide unit of FIG. 7A with the first surface facing forwards.

FIG. 7A is a schematic three-dimensional view of the backlight module according to a sixth embodiment of the present invention, and FIG. 7B is a perspective view of the light guide unit of FIG. 7A with the first surface facing forwards. Referring to FIGS. 7A and 7B, a backlight module 200e of this embodiment is similar to the backlight module 200d, and the difference between the backlight module 200e and the backlight module 200d is described as follows. In the backlight module 200e of this embodiment, a first direction D1'(i.e. the extending direction of each of the rod lenses 320) is substantially parallel with the light incident surface 316, and a second direction D2' (i.e. the arrangement direction of the rod lenses 320) is substantially perpendicular to the light incident surface 316. In addition, the distribution of the diffusion net points 318 is also changed with the first direction D1' and the second direction D2' as compared with the fifth embodiment. Particularly, in this embodiment, pitches P1' of the adjacent diffusion net points 318 in the first direction D1' are smaller than pitches P2' in the second direction D2'. In addition, in this embodiment, widths W2" of the diffusion net points 318 in the second direction D2' increase progressively along the direction away from the light incident surface 316.

It should be noted that in other embodiments, the first direction and the second direction may also be respectively substantially parallel with and perpendicular to the light incident surface, and the number densities of the diffusion net points increase progressively along the direction away from the light incident surface. Alternatively, the first direction and the second direction are respectively substantially parallel with and perpendicular to the light incident surface, and the diffusion net points form the plurality of strip patterns as the plurality of strip patterns in the fourth embodiment.

To sum up, in the light guide unit according to the embodiments of the present invention, the rod lenses have the curved surfaces curving in the second direction, and the pitches of the diffusion net points in the second direction are larger than the pitches of the diffusion net points in the first direction, so the rod lenses may reduce the pitches of the bright spots of the diffusion net points resulting from the scattered light beam in the second direction to a degree that may not be recognized by naked eyes. In this manner, when the diffusion net points are formed on the light guide plate, it is possible to use the screen printing method with lower cost, and as for the surface light source generated by the backlight module, the problem that the discrete bright spots are viewed by the naked eyes of the user is also avoided. In other words, the light guide unit according to the embodiment of the present invention may uniformly guide the light beam outward, and may have lower cost. Therefore, the backlight module according to the embodiment of the present invention may form the uniform surface light source and may have lower cost.

In addition, when it intends to dispose the prism lens above the light guide plate to make the surface light source more converged, the diffusion plate between the rod lenses and the prism lens may be omitted since the bright spots generated by the diffusion net points may not be recognized by the naked eyes because of the effect of the rod lenses, thus further reducing the cost of the backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide unit, comprising:
a light guide plate, having a first surface, a second surface opposite to the first surface, and a light incident surface connecting the first surface and the second surface, wherein the light guide plate further has a plurality of diffusion net points located at the second surface; and
a plurality of rod lenses, disposed on the first surface, wherein each of the rod lenses is capable of extending along a first direction and has a curved surface curving in a second direction, wherein the first direction is substantially perpendicular to the second direction, the rod lenses are arranged along the second direction, and pitches of the adjacent diffusion net points in the first direction are smaller than pitches of the adjacent diffusion net points in the second direction.

2. The light guide unit according to claim 1, wherein the light guide plate and the rod lenses are integrally formed, and the first direction is substantially perpendicular to the light incident surface.

3. The light guide unit according to claim 1, wherein the rod lenses are capable of forming a rod lens plate, and the rod lens plate and the light guide plate are separately formed.

4. The light guide unit according to claim 1, wherein widths of the diffusion net points in the second direction are capable of increasing progressively along a direction away from the light incident surface.

5. The light guide unit according to claim 1, wherein numbers densities of the diffusion net points are capable of increasing progressively along a direction away from the light incident surface.

6. The light guide unit according to claim 1, wherein the diffusion net points are capable of forming a plurality of strip patterns, each of the strip patterns is capable of extending away from the light incident surface, the strip patterns are arranged along a direction parallel with the light incident surface, and a width of each of the strip patterns is capable of increasing progressively along a direction away from the light incident surface.

7. The light guide unit according to claim 1, wherein the curved surfaces of the rod lenses are convex surfaces.

8. The light guide unit according to claim 1, wherein the curved surfaces of portions of the rod lenses are each a convex surface, the curved surfaces of other portions of the rod lenses are each a concave surface, and the convex surfaces and the concave surfaces are alternately arranged in the second direction.

9. A backlight module, comprising:
a light guide unit, comprising:
a light guide plate, having a first surface, a second surface opposite to the first surface, and a light incident surface connecting the first surface and the second surface, wherein the light guide plate further has a plurality of diffusion net points located at the second surface; and
a plurality of rod lenses, disposed on the first surface, wherein each of the rod lenses is capable of extending along a first direction and has a curved surface curving in a second direction, wherein the first direction is substantially perpendicular to the second direction, the rod lenses are arranged along the second direction, and pitches of the adjacent diffusion net points in the first direction are smaller than pitches of the adjacent diffusion net points in the second direction; and
a light emitting element, disposed beside the light incident surface, wherein the light emitting element is adapted to emit a light beam, the light beam is capable of entering the light guide plate through the light incident surface and is transmitted to the rod lenses through the first surface.

10. The backlight module according to claim 9, wherein the light guide plate and the rod lenses are integrally formed, and the first direction is substantially perpendicular to the light incident surface.

11. The backlight module according to claim 9, wherein the rod lenses are capable of forming a rod lens plate, and the rod lens plate and the light guide plate are separately formed.

12. The backlight module according to claim 9, wherein widths of the diffusion net points in the second direction are capable of increasing progressively along a direction away from the light incident surface.

13. The backlight module according to claim 9, wherein number densities of the diffusion net points are capable of increasing progressively along a direction away from the light incident surface.

14. The backlight module according to claim 9, wherein the diffusion net points are capable of forming a plurality of strip patterns, each of the strip patterns is capable of extending away from the light incident surface, the strip patterns are arranged along a direction parallel with the light incident surface, and a width of each of the strip patterns is capable of increasing progressively along a direction away from the light incident surface.

15. The backlight module according to claim 9, wherein the curved surfaces of the rod lenses are convex surfaces.

16. The backlight module according to claim 9, wherein the curved surfaces of portions of the rod lenses are each a convex surface, the curved surfaces of other portions of the rod lenses are each a concave surface, and the convex surfaces and the concave surfaces are alternately arranged in the second direction.

17. The backlight module according to claim 9, further comprising a reflecting unit, disposed on one side of the second surface for reflecting the light beam to the first surface.

* * * * *